Aug. 24, 1926.

J. E. OLSON 1,597,617

ADJUSTABLE VAT HEAD LOCK

Filed April 10, 1925

Inventor

J. E. Olson

By C. A. Snow & Co.

Attorneys.

Patented Aug. 24, 1926.

1,597,617

UNITED STATES PATENT OFFICE.

JOHN E. OLSON, OF SIOUX FALLS, SOUTH DAKOTA.

ADJUSTABLE VAT-HEAD LOCK.

Application filed April 10, 1925. Serial No. 22,128.

This invention relates to locks for vat heads and the object thereof is to provide a lock of this character in which no obstructions are presented on the inner face of the vat thereby avoiding tearing of the cleaning brushes.

Another object of the invention is to so construct such a lock that the head may be secured at any desired point within the vat and which may be quickly applied or removed.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Vats used in packing plants for curing meats and the like are designed to be filled with pickles and in order to keep the meat under the pickle a head must be placed in the vat and fastened down. In vats as now constructed two lugs are bolted to the inside thereof at the very top and a stick is placed across under these lugs to hold a vat head down. This is objectionable for the reason that the lugs tear up the brushes of the cleaning machines used for washing the vat and moreover they do not permit the fastening of the vat head at different points so that it may be used whether the vat is full or not. It is to overcome these objections that this improved vat head lock has been designed.

The adjustable vat head lock 10 constituting this invention is composed of two iron bars 11 and 12 provided at their outer ends respectively with prongs or spurs 13 and 14 which are designed to be forced in the opposed side walls of the vat 1 in connection with which this lock is to be used.

Figure 2:
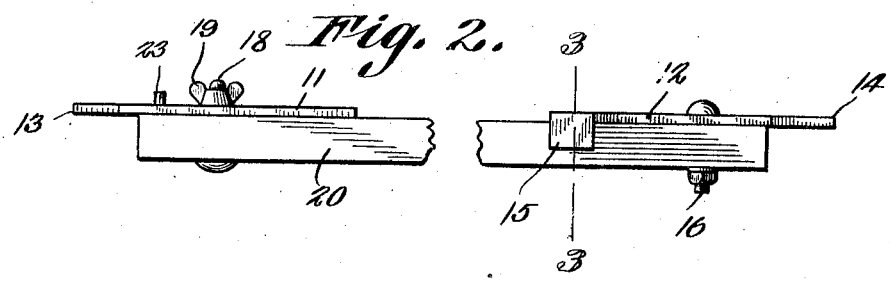
Fig. 2 is a side elevation of the lock with parts broken out.
Figure 4:
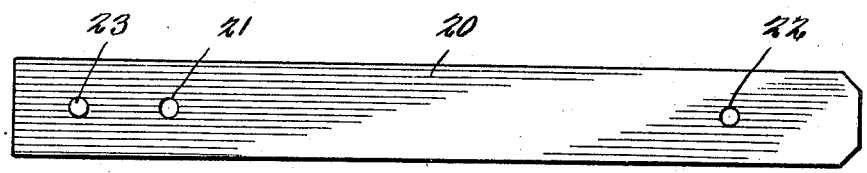
Fig. 4 is a plan view of one member of the lock.
Figure 3:
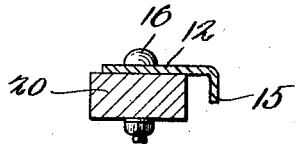
Fig. 3 is a detail transverse section taken on the line 3—3 of Fig. 2.

These irons 11 and 12 are connected by a wooden bar 20 provided near its opposite ends with apertures 21 and 22 for connection of the bars 11 and 12, bar 12 being pivotally connected with the bar 20 by means of a bolt 16 passing through bar 12 and the apertures 22 in the bar 20 as is shown clearly in Fig. 2.

Figure 1:
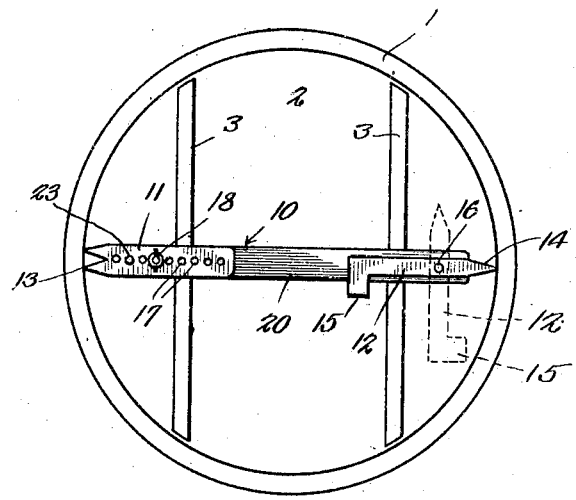
Figure 1 represents a plan view of a vat equipped with a head having this improved lock shown applied.

The metal bar 12 is provided at its inner end with a laterally and downwardly extending lug 15 which is designed to abut one side of the bar 20 when said bar 12 is in closed position as shown in Figs. 1 and 2 to limit the swinging movement of said bar 12.

Bar 11 is provided with a plurality of longitudinally spaced apertures 17 to adjustably receive a bolt 18 which connects bar 11 with bar 20, said bolt being preferably equipped with a wing nut 19 to facilitate its application and removal.

The connecting bar 20 has a stud 23 adapted to be entered through one of the apertures 17 in bar 11 to cooperate with the bolt 18 to hold bar 11 against turning on bar 10.

This locking stick 10 is shown resting on cleats 3 arranged transversely of the upper face of the vat head 2 and when the device is in use the head 2 is inserted in the vat to the desired point and stick 20 has the member 11 adjusted so that the stick 10 will correspond in length substantially with the diameter of the vat and after the prongs 13 have been embedded in the vat walls or engaged with the walls, the lever 12 is swung into the full line position shown in Fig. 1 which causes the prong 14 thereof to be forcibly engaged with the side wall of the vat and will thus hold the stick securely in locked position and prevent the vat head 2 from rising under the influence of the pickling liquid. The lug 15 engages the side wall of the connecting bar 20 to limit the swinging of the lever 12 to prevent its passing beyond the center.

It will thus be seen that this vat head lock will securely hold the head in adjusted position within the vat at any desired point and requires no projections permanently located on the inner face of the vat.

I claim:—

A locking device for securing heads in barrels, including a main bar placed on the head, a stud extending upwardly from the bar adjacent to one end thereof, a securing bar having a plurality of spaced openings, said stud adapted to extend through one of the openings, a bolt adapted to extend through the main bar and an opening of the securing bar to adjustably secure the securing bar to the main bar, a pivoted securing bar having a pointed extremity mounted on the opposite end of the main bar and having a lug adapted to engage one side of the main bar and restrict movement of the pivoted securing bar, and said securing bars adapted to engage the inner surface of the barrel.

In testimony that I claim the foregoing as my own, I have hereto affixed my signature.

JOHN E. OLSON.